(12) United States Patent
Liu et al.

(10) Patent No.: US 9,959,597 B1
(45) Date of Patent: May 1, 2018

(54) NOISE REDUCTION WITH MULTI-FRAME SUPER RESOLUTION

(71) Applicant: PIXELWORKS, INC., Portland, OR (US)

(72) Inventors: Guodong Liu, Shanghai (CN); Junhua Chen, Shanghai (CN)

(73) Assignee: PIXELWORKS, INC., Portland, OR (US)

( * ) Notice: Subject to any disclaimer, the term of this patent is extended or adjusted under 35 U.S.C. 154(b) by 0 days. days.

(21) Appl. No.: 15/632,590

(22) Filed: Jun. 26, 2017

Related U.S. Application Data

(63) Continuation of application No. 14/107,975, filed on Dec. 16, 2013, now Pat. No. 9,691,133.

(51) Int. Cl.
*G06K 9/40* (2006.01)
*G06T 3/40* (2006.01)
*G06T 5/00* (2006.01)

(52) U.S. Cl.
CPC ............ *G06T 3/4076* (2013.01); *G06T 5/002* (2013.01)

(58) Field of Classification Search
CPC . G06T 5/002; G06T 5/50; G06T 2207/20201; G06T 2207/20221; H04N 19/44; H04N 19/51; H04N 19/80; H04N 19/86; H04N 19/103; H04N 19/159; H04N 19/172; H04N 19/46; H04N 19/61
See application file for complete search history.

(56) References Cited

U.S. PATENT DOCUMENTS

| | | | |
|---|---|---|---|
| 5,410,553 A | 4/1995 | Choon | |
| 5,777,682 A | 7/1998 | De Haan et al. | |
| 5,867,219 A | 2/1999 | Kohiyama | |
| 6,307,888 B1 * | 10/2001 | Le Clerc | H04N 17/004 348/607 |
| 8,364,471 B2 * | 1/2013 | Yoon | G10L 19/028 704/206 |
| 8,447,138 B2 * | 5/2013 | Oryoji | G06T 3/4053 382/290 |
| 8,862,987 B2 | 10/2014 | Haussecker | |
| 9,691,133 B1 * | 6/2017 | Liu | G06T 3/4076 |
| 2003/0011709 A1 | 1/2003 | Kasahara et al. | |
| 2003/0169820 A1 * | 9/2003 | Babonneau | H04N 19/51 375/240.29 |
| 2004/0179594 A1 | 9/2004 | Biswas et al. | |
| 2004/0233326 A1 | 11/2004 | Yoo et al. | |
| 2004/0263685 A1 | 12/2004 | Song | |
| 2005/0025244 A1 | 2/2005 | Lee et al. | |
| 2005/0219642 A1 * | 10/2005 | Yachida | H04N 5/23245 358/448 |

(Continued)

*Primary Examiner* — Mekonen Bekele
(74) *Attorney, Agent, or Firm* — Marger Johnson

(57) ABSTRACT

A method of generating super resolution image data includes receiving original image data of a low resolution at an image processing device, performing motion compensation on the original image data using a current frame of image data and at least one previous frame of image data and at least one future frame of image data as reference frames, generating motion vectors, applying noise reduction to the current frame of image data and the reference frames to produce noise reduced, current frame image data, and generating a current frame of super resolution image data using the noise reduced, current frame image data.

10 Claims, 13 Drawing Sheets

(56) References Cited

U.S. PATENT DOCUMENTS

| | | | |
|---|---|---|---|
| 2005/0281479 A1* | 12/2005 | Song | H04N 19/139 382/275 |
| 2006/0215057 A1 | 9/2006 | Tanaka | |
| 2007/0071104 A1 | 3/2007 | Kondo | |
| 2007/0248166 A1* | 10/2007 | Chen | H04N 19/51 375/240.16 |
| 2009/0092337 A1* | 4/2009 | Nagumo | G06T 3/4053 382/299 |
| 2010/0086220 A1 | 4/2010 | Minear | |
| 2010/0114585 A1* | 5/2010 | Yoon | G10L 19/028 704/500 |
| 2010/0183245 A1 | 7/2010 | Oryoji et al. | |
| 2011/0058106 A1 | 3/2011 | Bruna Estrach et al. | |
| 2011/0242417 A1 | 10/2011 | Saito et al. | |
| 2011/0261264 A1 | 10/2011 | Zafarifar et al. | |
| 2011/0274370 A1 | 11/2011 | Kondo et al. | |
| 2012/0188373 A1* | 7/2012 | Kwon | H04N 1/409 348/148 |
| 2012/0300122 A1* | 11/2012 | Liu | H04N 7/0117 348/441 |
| 2013/0141641 A1 | 6/2013 | Wu et al. | |
| 2014/0254678 A1 | 9/2014 | Beric et al. | |
| 2014/0286593 A1* | 9/2014 | Numata | G06T 5/002 382/275 |
| 2014/0327820 A1* | 11/2014 | Iketani | H04N 7/012 348/452 |
| 2015/0381870 A1* | 12/2015 | Weng | H04N 5/2355 348/220.1 |

\* cited by examiner

NOISE REDUCTION WITH MULTI-FRAME SUPER RESOLUTION

CROSS REFERENCE TO RELATED APPLICATION

This application is a continuation of and claims priority to U.S. patent application Ser. No. 14/107,975, filed Dec. 16, 2013, which is incorporated herein by reference in its entirety.

BACKGROUND

Super resolution techniques generate higher resolution images to allow original, lower resolution image data to be displayed on higher resolution display systems. Super resolution techniques include multi-frame techniques. Multi-frame super resolution (MFSR) techniques fuse several low resolution (LR) frames. It can deliver rich details and makes the video more stable in the temporal domain. As a byproduct, MFSR can reduce noise to some extent.

However, if the number of low resolution frames is relatively low, such as less than or equal to 5 frames, the noise reduction performance is not good. This results in requiring other means of noise reduction. Typically, two different kinds of noise reduction may be used. One applies noise reduction for all of the input low resolution frames before doing the MFSR process. This increases the frame delay while the future low resolution frames have noise reduction applied to them.

An alternative approach applies noise reduction on the super resolution results of the MFSR process. This method requires more hardware resources because noise reduction operates on higher resolution frames. This also requires more memory and more processing because more data in involved.

The above noise reduction techniques may include motion adaptive or motion compensation processes because those are independent of the MFSR process and do not utilize any information from the super resolution process.

DETAILED DESCRIPTION OF THE EMBODIMENTS

Figure 1:
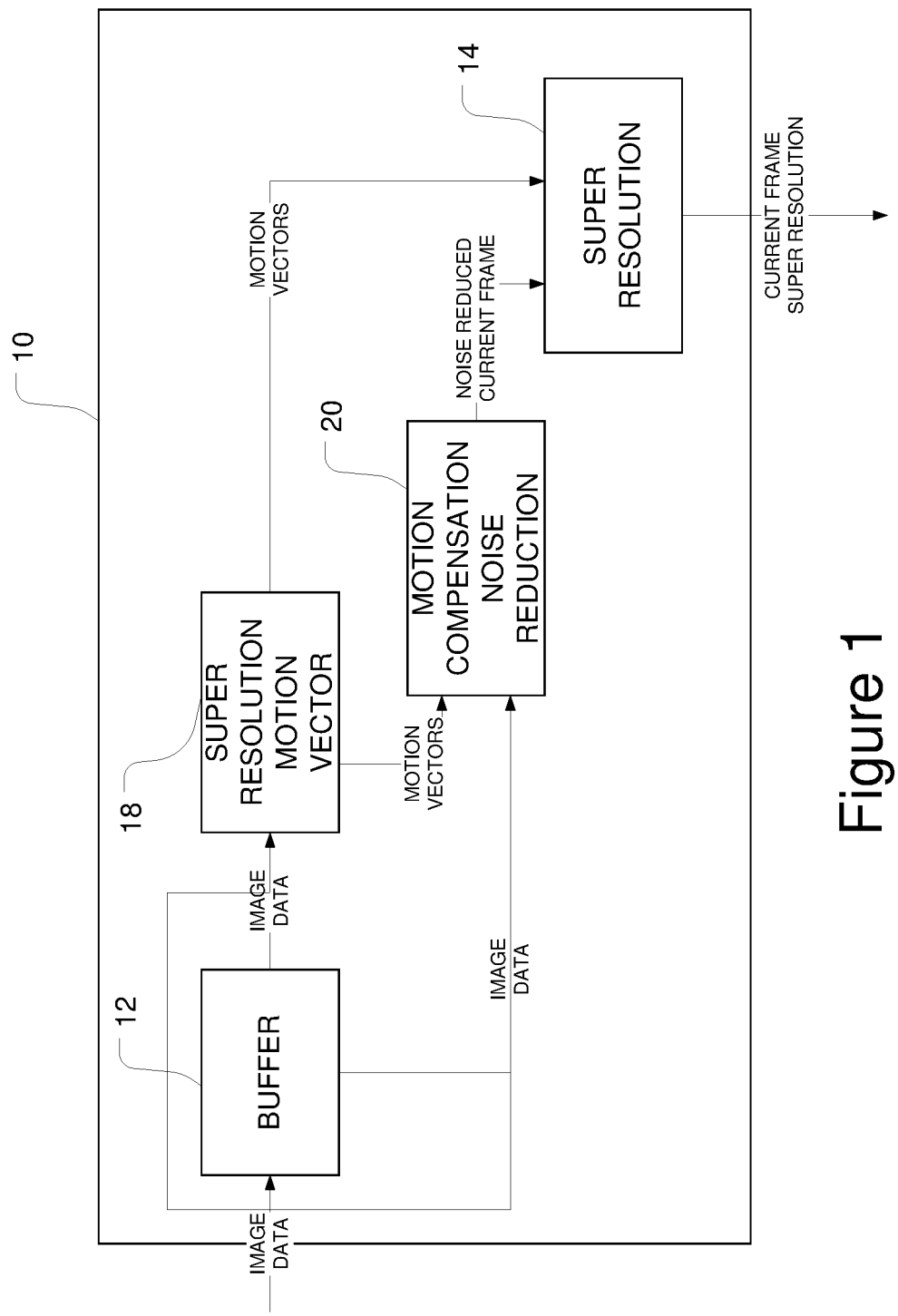
FIG. 1 shows an embodiment of an image processing device to perform noise reduction in a super resolution process.

FIG. 1 shows an embodiment 10 of a processing device to perform motion compensated noise reduction in a super resolution process. The processing device may be an image processor, a post processor or portions thereof, as well as dedicated circuits on a single integrated circuit or distributed among several integrated circuits. The embodiments here may also be implemented as software instructions performed by a processor, or instructions executed by logic circuitry. No limitation to any particular hardware or software configuration is intended nor should any be implied. The processing device takes the low resolution image data, performs motion compensation based noise reduction in the current image data, and then uses that noise-reduced data in the super resolution process. Because a multi-frame super resolution process needs multiple frames of data, the same multiple frames are used in the motion compensated noise reduction process.

Image data of an original resolution is received at the image processing device, possible at an input buffer. The image data is at an original resolution, which may be referred to as low resolution because (LR) it is at a lower resolution than a resulting super resolution image. The image data may consist of the instant image data, as well as image data that has been stored or delayed to allow data from three different timing intervals to be used. The frame of image data undergoing processing will be referred to here as the current frame, CF, of image data. The image data in the most recent and next most recent image frames will be referred to as the previous image data, and the frames of previous image data may consist of one frame, P1 the most recent frame, or of two frames, P1 and P2, the next most recent frame. Similarly, the image data just before the current frame being processed will be referred to as the first future frame, F1 and the next most future frame, F2. In the following, suffix_LR is used to represent that the image data is at low resolution, superscript is used to represent that the image data has undergone noise reduction.

The image data then passes to a motion vector module 18 and a motion compensation based noise reduction module 20. The motion vectors for the current frame and at least one of the future frames and at least one of the previous frames also passes to the motion compensation noise reduction module 20. The super resolution module then receives the noise reduced current frame (CF_LR'), the motion vectors, the image data of noise reduced previous frames (P1_LR', P2_LR') and unprocessed future frames (F1_LR, F2_LR) to produce a current frame of super resolution data.

Figure 2:
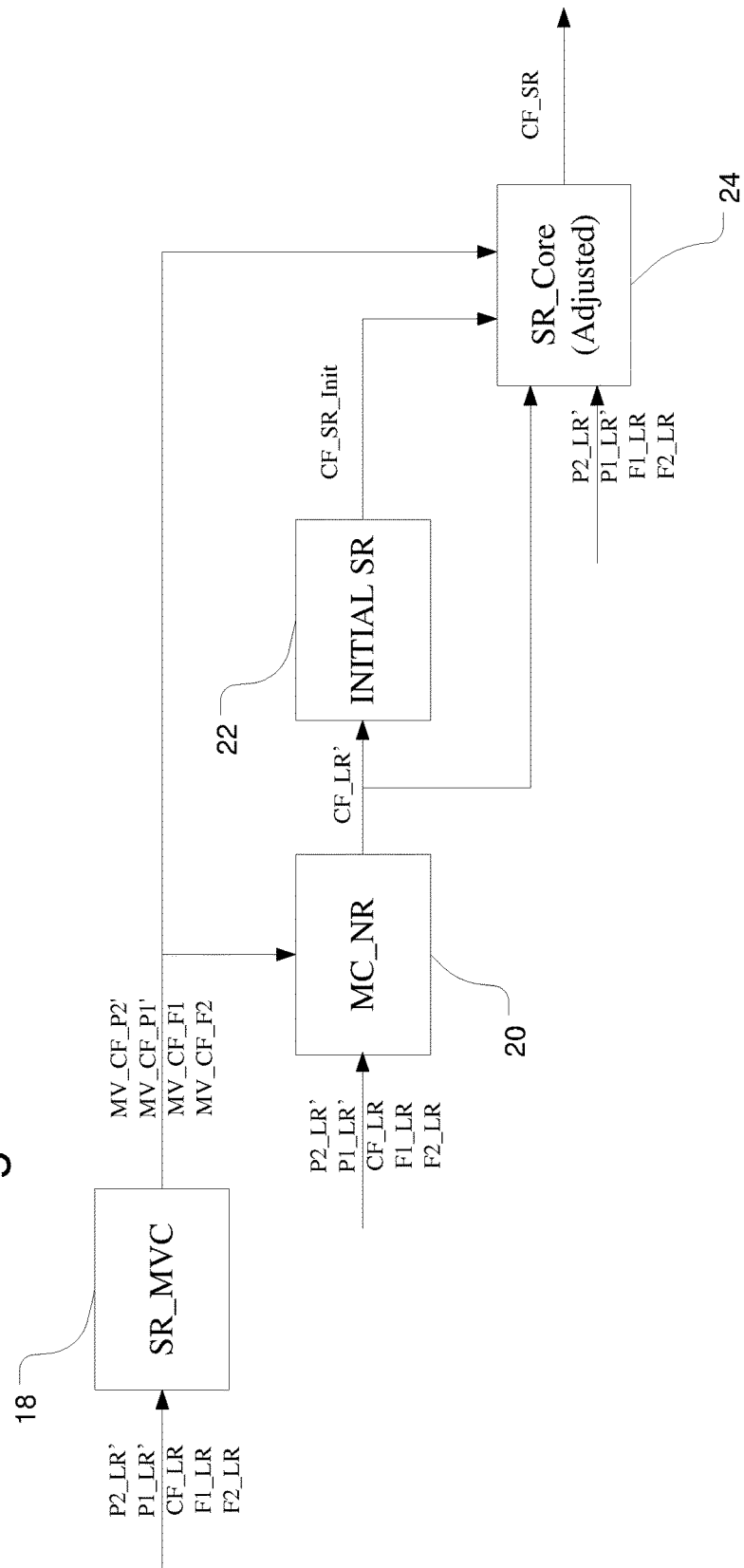
FIG. 2 shows an embodiment of a flow chart of a method to perform noise reduction during a multi-frame super resolution process.

FIG. 2 shows a flowchart of an embodiment of noise reduction in multi-frame super resolution process in a more detail view. The super resolution motion vector calculation module 18 receives five frames of image data, the current frame of image data, the two most previous frames of image data, and the two most future frames of image data. The two most previous frames of image data have already undergone noise reduction and will be noted as P2_LR' and P1_LR'. As each frame undergoes noise reduction, it will be designated as such when it becomes a previous frame for the next frame in the process.

The super resolution motion vector calculations may use one or more methods including, but not limited to: a phase plane correlation (PPC) sub-block that calculates the motion vectors by performing phase plane correlation analysis using frames of low resolution image data, 3D recursive and optical flow. In the preferred embodiment a combination of 3D recursive and PPC motion vector calculation is used.

The motion compensated noise reduction module 20 then uses the motion vectors and the image data to produce a noise-reduced version of the current frame of low resolution data. This then undergoes an initial interpolation process at initial super resolution module 22, such as low angle interpolation, and scaling to generate a first estimate of the current frame of super resolution image data, CF_SR_Init. This estimate, the noise-reduced frame CF_LR' of current image data and the four other frames (P2_LR', P1_LR', F1_LR, F2_LR) of low resolution image data feed into a super resolution core that then generates a current frame of super resolution data.

Figure 3:
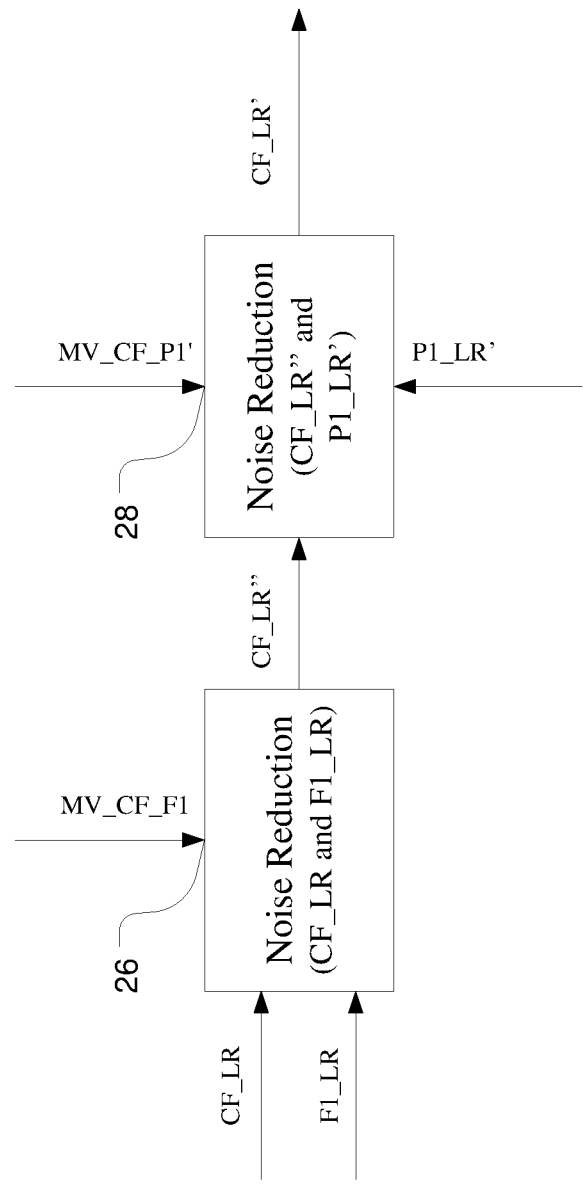
FIG. 3 shows a flow chart of an embodiment of filtering order among frames for a noise reduction process.
Figure 4:
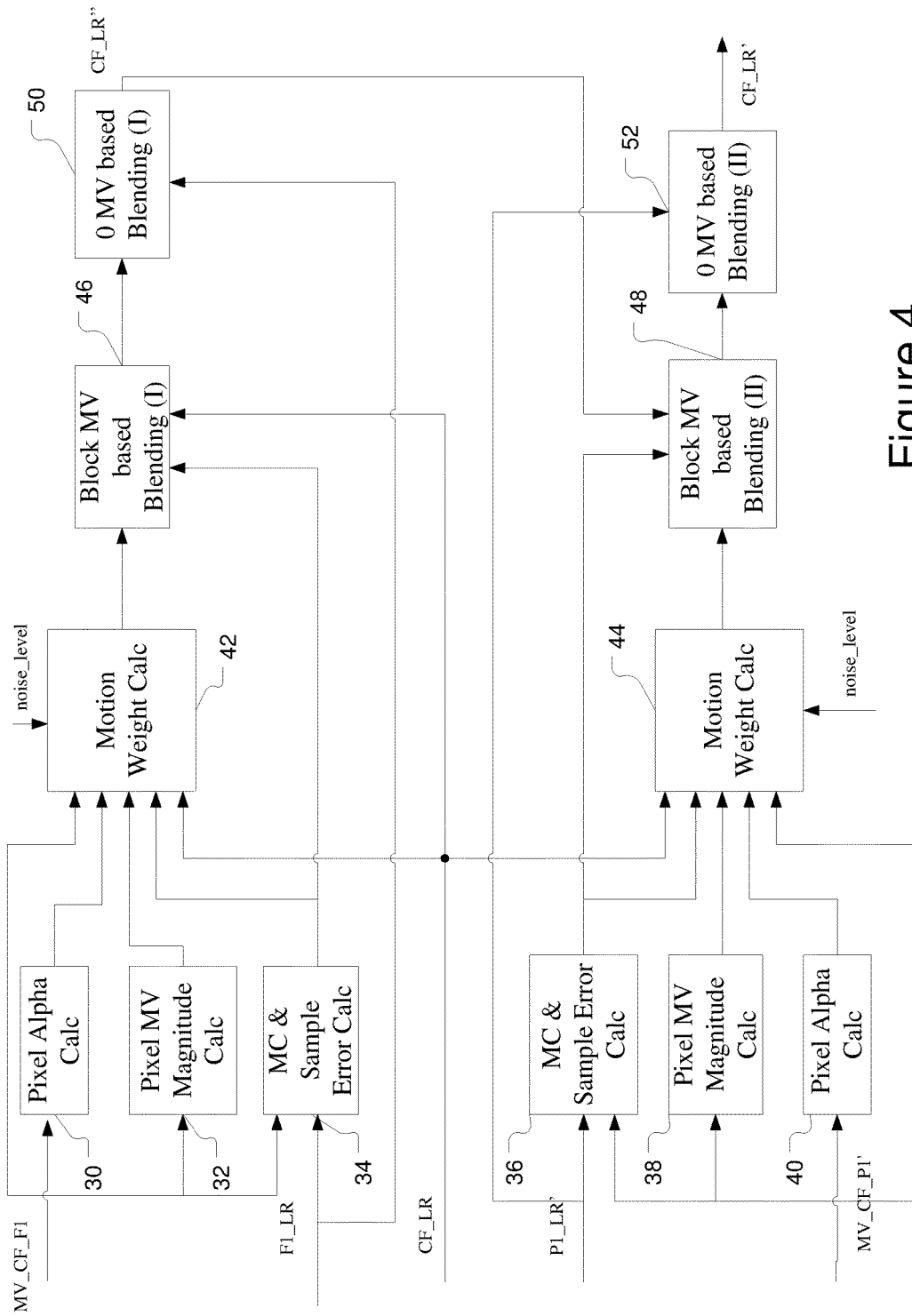
FIG. 4 shows an embodiment of a flow chart of a motion compensation based noise reduction process.

FIGS. 3 and 4 show more detailed views of a noise reduction process. In FIG. 3, module 26 uses the current low resolution frame of image data, the next most future frame of low resolution data and the motion vectors between the two to produce a first version of a noise reduced current frame of image data, CF_LR". This noise reduced version of the current frame then undergoes another noise reduction process with the most previous frame of low resolution data and the motion vector between the current frame and the most previous frame. This results in a motion compensated, noise reduced current frame of low resolution image data, CF_LR'. Here, the image data is designed for reducing noise of progressive input. For interlaced input, P2_LR' and F2_LR fields play the same roles as P1_LR' and F1_LR frames respectively, i.e., P2_LR' and F2_LR field rather than P1_LR' and F1_LR fields is used for reducing noise of CF_LR filed. The algorithm logic is same for both progressive and interlaced inputs.

FIG. 4 shows a more detailed view of the noise reduction process. The motion vectors from super-resolution motion vector calculation have a confidence measure using alpha values for the each 4×4 block (blk_alpha_sad). The block alpha is related to the Sum of Absolute Differences (SAD) between the block and another block pointed by block motion vector. In principle, the smaller SAD is, the bigger blk_alpha_sad is. Another motion vector confidence value is based more on the image details/textures for noise reduction (blk_alpha_peak). It is evaluated by peaks of phase plane correlation. In principle, blk_alpha_peak is usually only large if there are details. These two confidence values are blended for noise reduction. These may be blended as follows:

diff_alpha=blk_alpha_peak−blk_alpha_sad);

if diff_alpha>0, adj_blk_alpha=blk_alpha_sad+min (diff_alpha,Thr_Alpha_P);

If diff_alpha<=0, adj_blk_alpha=blk_alpha_sad+max (diff_alpha,−Thr_Alpha_N).

Figure 5:
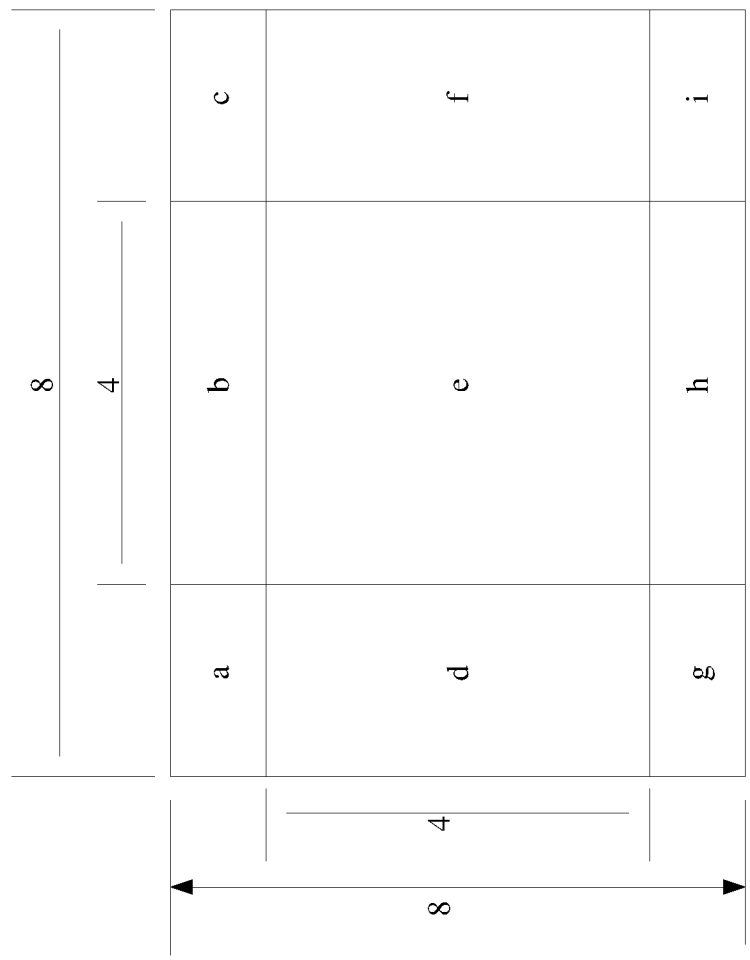
FIG. 5 shows an embodiment of extending blocks to provide a confidence measure.

Here, Thr_Alpha_P and Thr_Alpha_N are thresholds to control the adjustment level. The pixel alpha at 30 and 40 is decomposed from these adjusted block alphas in 3×3 neighborhood of 4×4 blocks according to pixel positions in an 8×8 block. This 8×8 block results from extending a 4×4 block such as e as shown in FIG. 5. An example of such a decomposition is discussed in co-pending patent application Ser. No. 13/303,660, filed Nov. 23, 2011.

Figure 6:
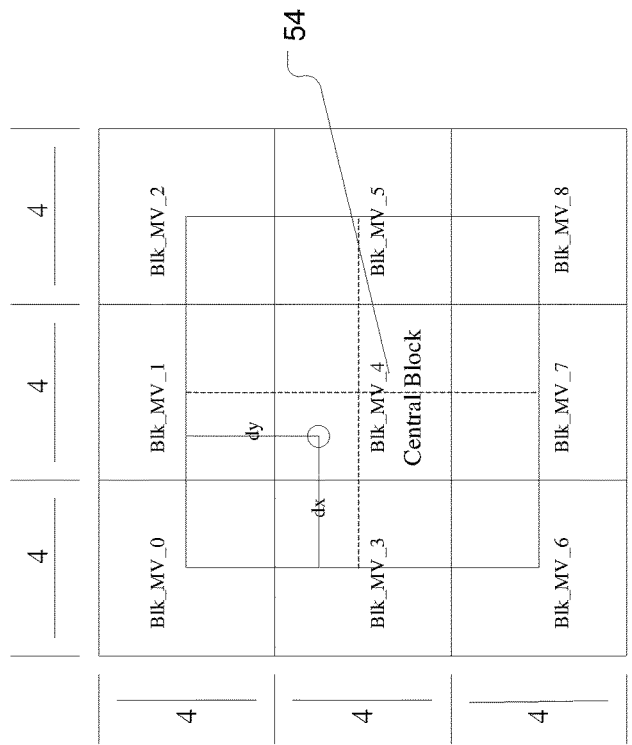
FIG. 6 shows an embodiment of calculating pixel motion vector magnitude by decomposing block motion vector magnitudes.

The pixel motion vector magnitude at 32 and 38 is used to evaluate whether a pixel has motion. It is decomposed from the magnitudes of the four block motion vectors, in one example using bilinear interpolation. All these block motion vectors come from a 3×3 neighborhood of 4×4 blocks. The central block is the block where the current pixel is. The magnitude of one block motion vector, blk_mv, can be found by blk_mv_mag=max(abs(blk_mv.x), abs(blk_mv.y)). FIG. 6 shows an example to get the pixel motion vector magnitude pix_mv_mag for a pixel represented by a circle. The calculation formula is pix_mv_mag=bilinear(blk_mv_mag_0, blk_mv_mag_1, blk_mv_mag_2, blk_mv_mag3, dx, dy).

Figure 7:
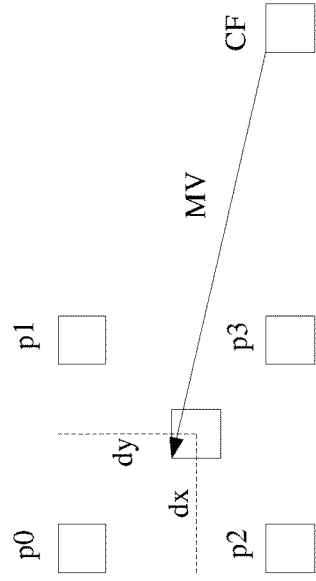
FIG. 7 shows an example of an interpolated pixel with its surrounding int-pixels

The block motion vector is at a sub-pixel accuracy level. Bilinear interpolation is therefore applied to get the pixel, pix_blk_mv, pointed to by the motion vector of the block including current pixel in CF_LR. The sample error, samp_err, is the minimal absolute difference among the interpolated pixel and the four integer pixel (p0, p1, p2, p3) around this sub-pixel. The interpolation pixel is calculated as pix_blk_mv=bilinear(p0, p1, p2, p3, dx, dy), where dx and dy are shown in the FIG. 7. The sample error is calculated as samp_err=min(abs(pi−pix_blk_mv)), i=0, 1, 2, 3.

Returning to FIG. 4, the motion weight calculation modules 42 and 44 generate an accurate motion weight. This is very important for noise reduction that does not reduce details or have other artifacts. The noise reduction calculates two kinds of weights, one is for the block motion vector and the other is for the 0 motion vector. The motion weight calculation is the same between 42 and 44. The flowchart of an embodiment of that motion weight calculation in 42 is shown in FIG. 8.

Figure 8:
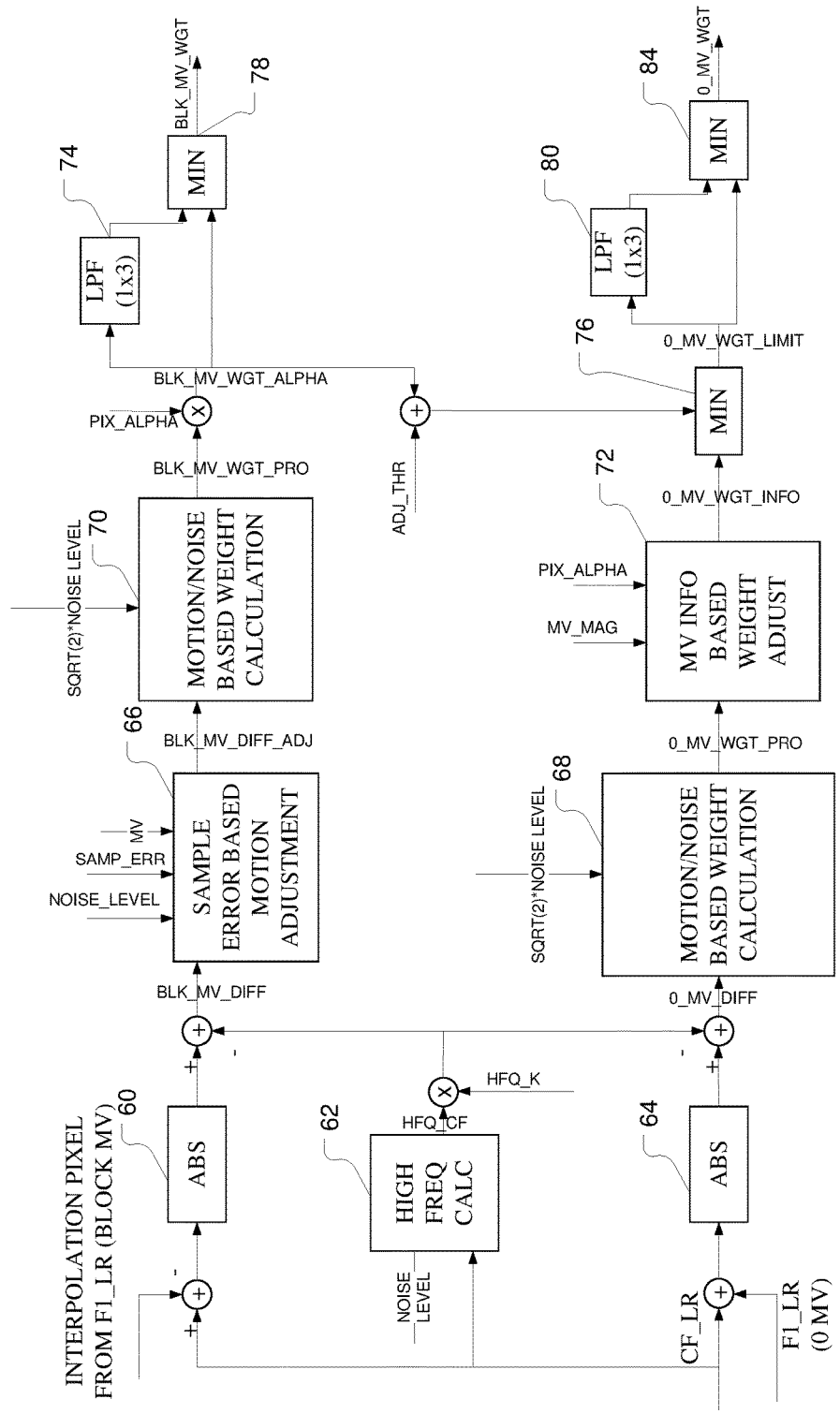
FIG. 8 shows an embodiment of a process of calculating accurate motion weights.

In FIG. 8, the interpolated pixel pointed by block motion vector, the int-pixel pointed by the 0 motion vector and current pixel at current frame CF_LR are used to generate the weights. The first two pixels are in same reference frame, in FIG. 8, the reference frame is F1_LR). The process uses a high frequency calculation at 62, sample error based motion adjustment at 66, and motion/noise based weight calculation at 68 and 70, motion vector information based weight adjustment at 72, and finally MIN and LPF operations.

The high frequency calculation at 62 calculates the high frequency component in a 3×3 neighborhood of current pixel in CF_LR. As it is known, the difference between interpolated pixel pointed by block/0 motion vector and current pixel at CF_LR is often bigger in high details region than that in smooth region even if the motion vector is very close to being correct. So, it is necessary to refine this difference by subtracting the high frequency component multiplied by a gain HFQ_K. The refined difference reflects motion error from motion vector. The pixels in the 3×3 neighborhood are pix_i, i=0, 1, 2 . . . , 8, which are arranged from top left to bottom right. The pixel pix_4 is the current pixel in CF_LR. The calculation is as follows: h_hfq=max (abs(pix_4−pix_3), abs(pix_4−pix_5), abs(pix_3−pix_5)); v_hfq=max(abs(pix_4−pix_1), abs(pix_4−pix_7), abs (pix_1−pix_7)); raw_hfq_cf=(h_hfq+v_hfq)/2. The raw_h-fq_cf is the raw high frequency component. The raw_hfq_cf is further refined by removing the noise as follows: hfq_cf=max(raw_hfq_cf−noise_level, 0). The hfq_cf is the output high frequency.

Figure 9:
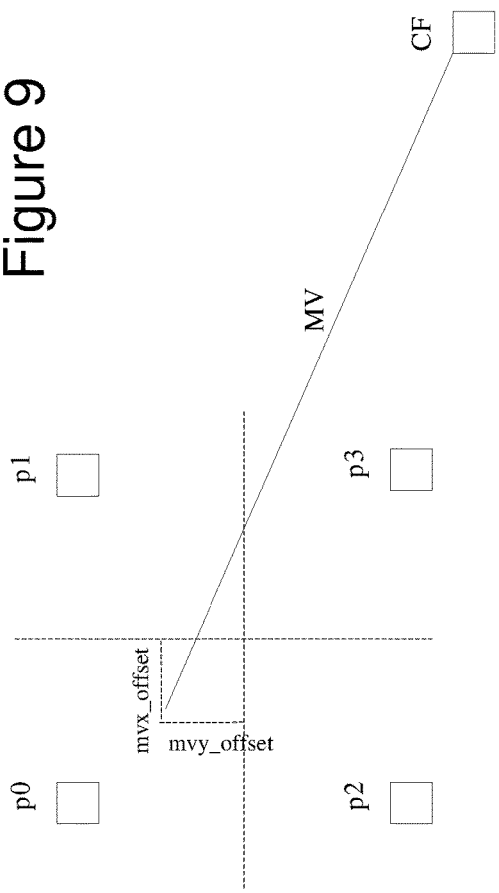
FIG. 9 shows an example of an interpolated pixel pointed by a motion vector with its surrounding pixels to calculate motion vector offsets.
Figure 10:
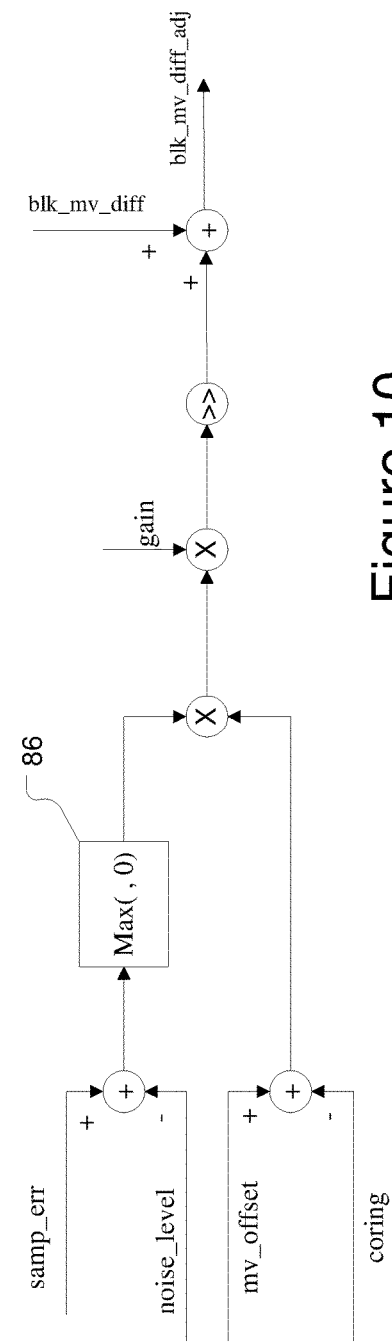
FIG. 10 shows a flowchart of an embodiment of a method of adjusting motion weight based on an interpolation error and motion vector offset.

The sample error based motion adjustment at 66 first calculates the motion vector offset which is to evaluate how far the interpolated pixel pointed by the current motion vector is from its nearest four integer pixels. A graphical representation of this is shown in FIG. 9, by mv_offset=max (0.5−mvx_offset, 0.5−mvy_offset). Here, mvx_offset and mvy_offset are the distances between current interpolated pixel and the sub-pixel at position (0.5, 0.5) in horizontal and vertical directions respectively. The smaller mv_offset is, the nearer the interpolated pixel is to one of its nearest four integer pixels. The process then adjusts pixel motion blk_mv_diff based on interpolation error and the motion vector offset, as shown in FIG. 10.

Figure 11:
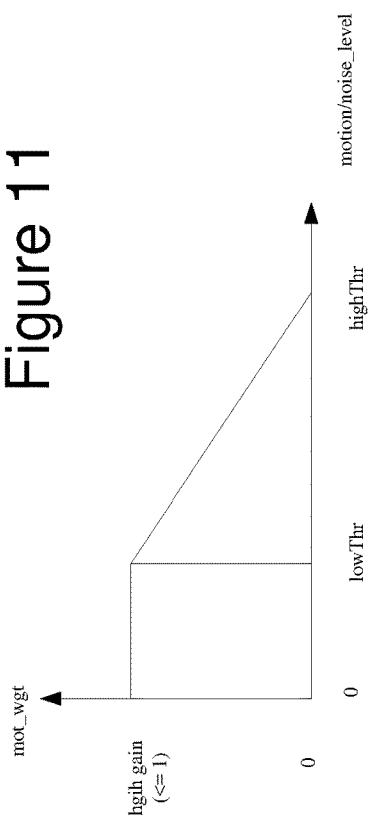
FIG. 11 shows a curve of motion weight calculated according to the ratio between motion and noise.

The basic rule is that the bigger the sample error and MV offset are, the more the pixel motion is increased. That is to say, the motion vector is not valid for the current pixel because it will reduce details or cause other artifacts. Returning to FIG. 8, the motion weight is calculated according to the ratio between the motion and noise level in modules 70 and 68. The motions are blk_mv_diff_adj and 0_mv_diff at 70 and 68 respectively. A graph of the relationship between motion weight and this ratio (motion/noise level) is shown in FIG. 11. If the ratio between motion and noise level is small, motion weight is big, the process should do stronger noise reduction filtering. If the ratio is very big, motion weight approximates 0, the process should not do noise reduction because the match between the current pixel and interpolated pixel pointed by motion vector is not correct. The output motion weights are blk_mv_wgt_pro and 0_mv_wgt_pro at 70 and 68 respectively. Note that the noise level at 70 and 68 is actually sqrt(2) times the estimated noise level because the input image data being used are from the noisy CF_LR and noisy F1_LR images.

Figure 12:
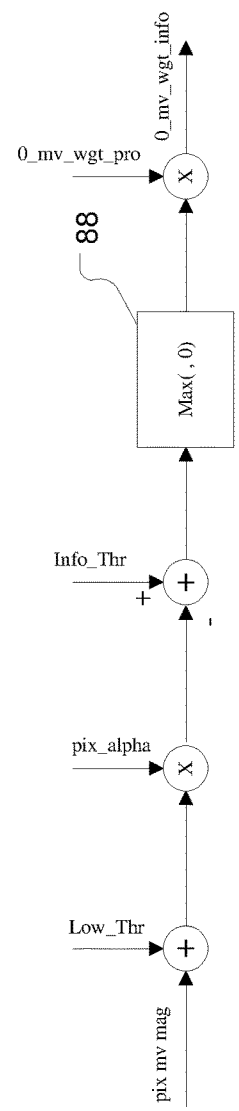
FIG. 12 shows a flowchart of an embodiment of a method to perform magnitude and confidence of block motion vector based weight adjustment for zero motion vector.

Also in FIG. 8, the motion vector information based weight adjustment in 72 is for zero motion vector. If the block motion vector is reliable and its magnitude is big, the process should decrease the blending weight for the zero motion vector. This is shown in FIG. 12.

Finally, the min and low pass filtering (lpf) operations in FIG. 8 are used to refine motion weight further in order to keep it consistent in the local neighborhood. LPF at 74 and MIN at 78 are for block motion vector. MIN at 76, LPF at 80 and MIN at 84 are for 0 motion vector. LPF at 74 does low pass filtering of blk_mv_wgt_alpha, which is the output of 70 multiplied by a pixel alpha, in a 1×3 neighborhood of current pixel. Then MIN at 78 selects the minimal value between the output of 74 and the current original blk_m-v_wgt_alpha. The output at 78 is the final block mv weight. MIN at 76 selects the minimal value between current original 0_mv_wgt_info and current blk_mv_wgt_alpha plus a given threshold adj_thr. This operation limits 0 motion vector weight to be smaller than the block motion vector weight. LPF at 80 does low pass filtering of 0_mv_wgt_limit, which is the output of 76, in a 1×3 neighborhood of current pixel. Then MIN at 84 selects the minimal value between the output of 80 and the current original 0_mv_wgt_limit.

Returning to FIG. 4, the outputs blk_mv_wgt and 0_mv_wgt of motion weight calculation in module 42 should be divided by 2. The reason is that both CF_LR and F1_LR are noisy images, the best noise reduction is obtained when they are averaged together. So, this group of blk_m-v_wgt and 0_mv_wgt are in the range [0, 1/2]. For module 44, the output of weights should not be adjusted because only CF_LR is noisy image and P1_LR' is filtered image, the best noise reduction is to give more weight to P1_LR' pixels when the motion vector is correct.

Returning to FIG. 4, block motion vector based blending at 46 is done as cf_lr_blk_mv=pix_cf_lr+blk_mv_wgt* (pix_blk_mv_f1_lr−pix_cf_lr). Here, pix_blk_mv_f1_lr is the interpolated pixel in F1_LR pointed by block motion vector between CF_LR and F1_LR, pix_cf_lr is current pixel in CF_LR which need noise reduction. The zero motion vector based blending at 50 is found as pix_cf_lr"=cf_lr_blk_mv+0_mv_wgt*(pix_0_mv_f1_lr−cf_lr_blk_mv). Here, pix_0_mv_f1_lr is the pixel in F1_LR pointed by zero motion vector between CF_LR and F1_LR, pix_cf_lr" is the output pixel undergone noise reduction.

Returning to FIG. 4, the module 44 also uses noise level at sub-module motion/noise based weight calculations. This noise level is the estimated noise level rather than sqrt(2) times of estimated noise level used in module 42 because the input image data are from a noisy CF_LR and filtered P1_LR'.

Returning to FIG. 4, the input image data for motion weight calculation at module 44 are the filtered most previous frame P1_LR' and the unprocessed current frame of low resolution CF_LR. However, the noise reduction by block motion vector based blending at module 48 used the image data of the filtered most previous frame P1_LR' and the filtered current frame from 50 by fusing current frame and the most future frame.

Returning to FIG. 2, super resolution core 24 can remove some noise because it fuses all of the low resolution frames when the accurate motion vectors are found. However, the noise reduction performance is not enough. In current MFSR algorithms, the previous and current frames are all filtered but the future frames are not filtered. Typically, low resolution frames are fused with weights only based on the confidence blk_alpha_sad of block motion vector. However, for smooth regions, it is better to decrease the fusion weight of future frames in order to fuse less data from them. Otherwise, the fused high resolution image still has obvious noise.

For texture regions, it is better to maintain the fusion weight based only on blk_alpha_sad of future frames in order to fetch enough details from them. Fortunately, there is another motion vector confidence blk_alpha_peak which correlates well with texture regions and only has a large confidence when current block has some details. A new motion vector confidence for future frames is generated based on blk_alpha_sad and blk_apha_peak as follows: new_blk_alpha=blk_alpha_sad−max(blk_alpha_sad−blk_a-lpha_peak, 0)*Smth_Adj_K. Here, Smth_Adj_K is gain to adjust blk_alpha_sad, which is not more than 0.5. Then, fusion weight for future frames can be calculated based on the new_blk_alpha.

It is necessary to estimate noise level for noise reduction. Noise statistics are used and that the noise obeys normal distribution is assumed. The noise distribution is analyzed between CF_LR and P1_LR', and CF_LR and F1_LR. In one embodiment, it is implemented by noise histogram with 64 bins at 100. Noise is highly related to brightness. Brightness distribution is shown by brightness histogram with 64 bins at 98.

Figure 13:
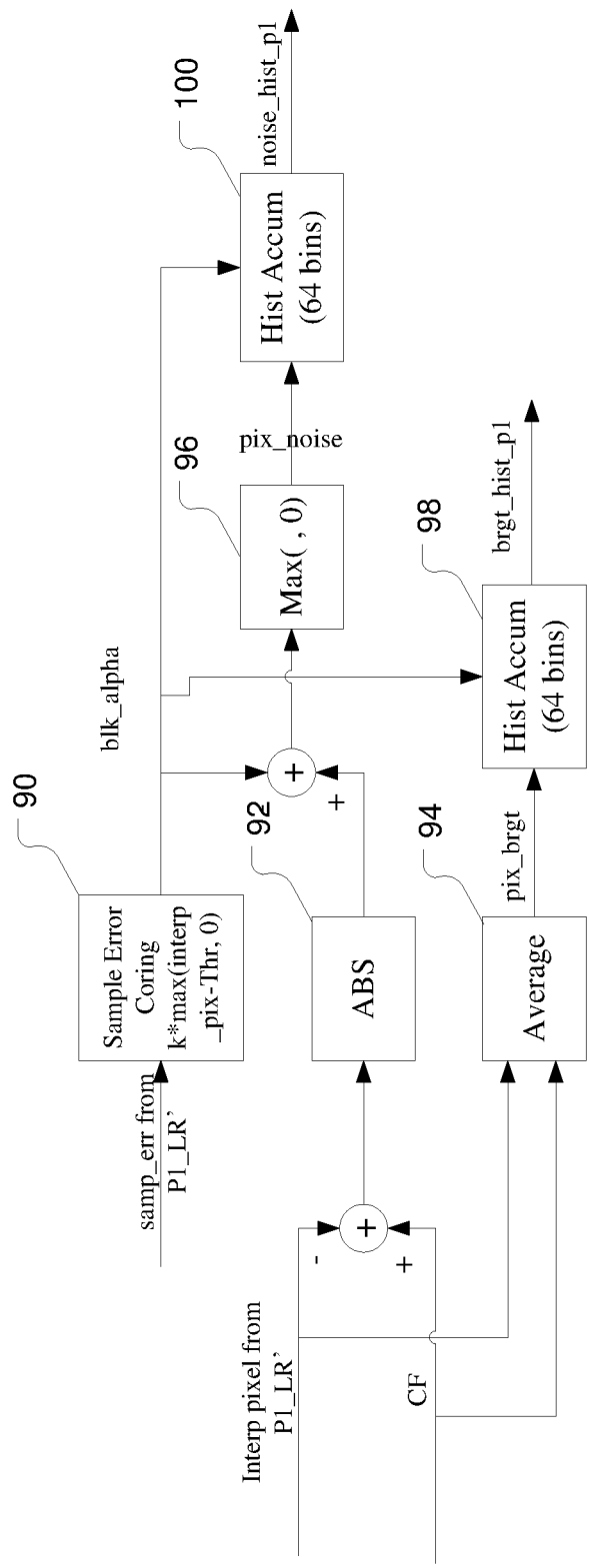
FIG. 13 shows a flowchart of an embodiment of a method to calculate distributions of noise and brightness between the current and previous frames.

FIG. 13 describes the noise and brightness distribution between CF_LR and P1_LR'. The method for noise and brightness distribution between CF_LR and F1_LR is same as that between CF_LR and P1_LR'. The pixel noise between CF_LR and P1_LR' is the absolute difference between a pixel pix_cf in CF_LR and its corresponding interpolation pixel pix_blk_mv in P1_LR', which is pointed by block motion vector. Because the corresponding pixel in P1_LR' is often from interpolation, sample error appears. In order to get more accurate pixel noise, it is necessary to remove the sample error from the raw difference as pix_noise=max(abs(pix_cf−pix_blk_mv)−Samp_Err_K*max(samp_err−Samp_Err_Coring, 0), 0). Here, Samp_Err_K and Samp_Err_Coring are gain and coring respectively to adjust sample error influence on pixel noise.

The pixel brightness is the average between a pixel in CF_LR and its corresponding pixel in P1_LR' which is pointed by block motion vector. If the block motion vector is reliable, that is the block alpha is big, the calculated pixel noise is effective. It is accumulated into the noise histogram as follows.

noise_hist_p1[min(pix_noise,63)]+=1.

If the block motion vector is reliable, the process accumulates the pixel brightness into the brightness histogram as follows.

Brgt_hist_p1[min(pix_brgt/4,63)]+=1.

Figure 14:
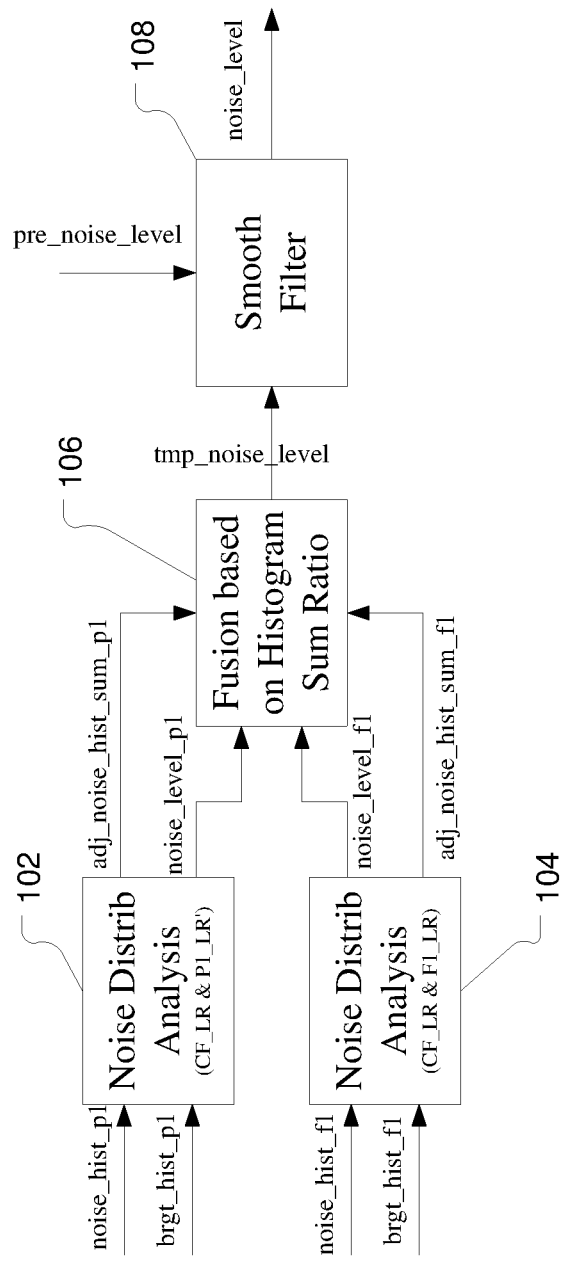
FIG. 14 shows a flowchart of an embodiment of a method of estimating noise.
Figure 15:
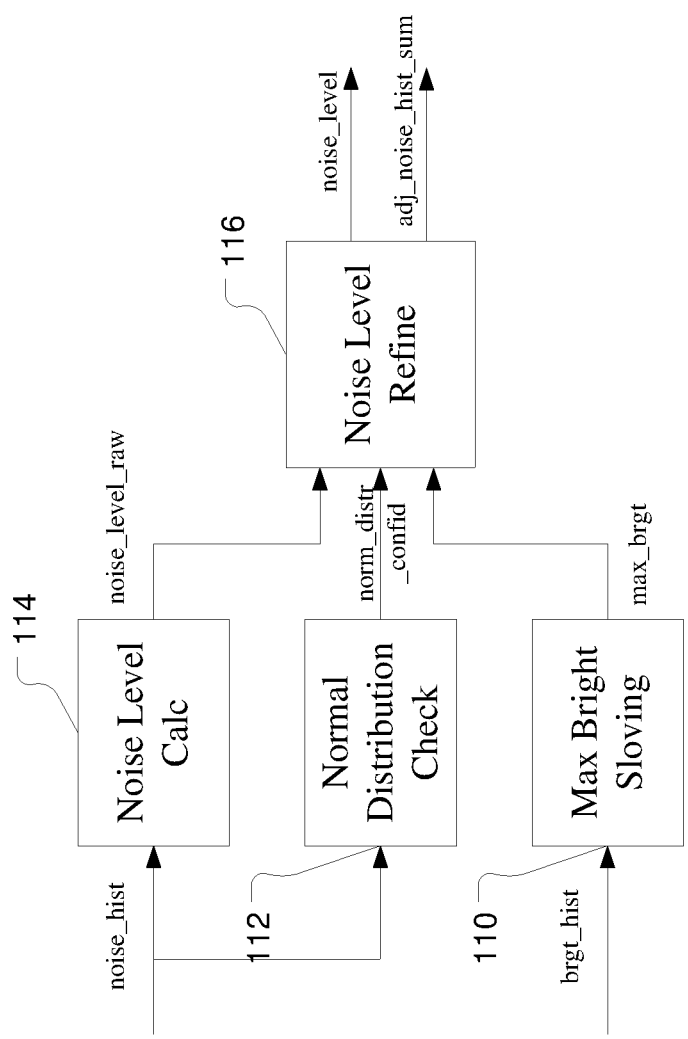
FIG. 15 shows a flowchart of an embodiment of a method of noise distribution analysis for estimating noise level.

Noise estimation is done by fusing forward and backward noise information. Because there are some occlusion regions, which are some regions that appear in the previous frame but disappear in future ones, or disappear in previous frame but appear in future ones, it is necessary to utilize two directions information as shown in FIG. 14. The process assumes that the noise obeys the normal distribution with mean 0 and standard deviation D. The standard deviation is defined as noise level. It is known the probability is about 0.68 when a random variable is in the interval (−D, +D).

Based on this rule, the process finds the noise level from the noise histogram. The process defines noise_hist_sum the sum of all bins of noise histogram. From bin 0, accumulate the value of bins. Because the noise is defined as the absolute value of the difference between pixels in two frames, the distribution represents the sum of the right and left hand side of the normal distribution. When the accumulated value is about 0.68*noise_hist_sum, the bin index is the raw noise level. Because CF_LR and F1_LR are both noisy images, the estimated noise level between them are sqrt(2) time of true noise of CF_LR. The process then divides this noise level by sqrt(2).

Figure 16:
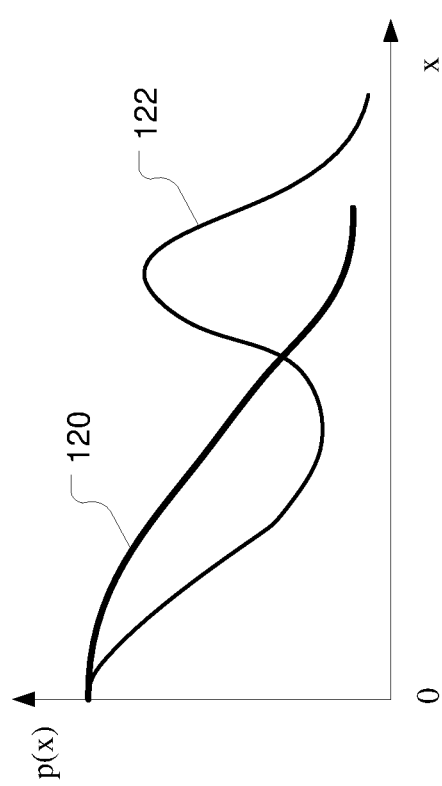
FIG. 16 shows an example of right and wrong normal distributions.

As a normal distribution, shown in FIG. 16 as 120, it only has one peak near the mean in the probability density curve. The noise histogram is an approximation of the density curve. If the histogram values for bins that are far from the mean are also peaks, the distribution is not normal. The maximal brightness max_bright reflects the brightness level of the whole image. It is calculated based on the brightness histogram. The process defines bright_hist_sum the sum of all bins of the brightness histogram. From bin 0, accumulate the value of bins. When the accumulated value is about 0.75*bright_hist_sum, the current bin index is taken as maximal brightness. The parameter 0.75 is set based on experience.

If the noise actually obeys normal distribution and the maximal brightness is small, it is better to increase the noise level. The noise level is refined as: noise_level=noise_level_raw+min(max(Bright_Thr−max_bright, 0)*Bright_K, min(noise_level_raw, Noise_Adj_Thr)). Here, Bright_Thr is a threshold of maximal brightness, Bright_K is gain for maximal brightness, Noise_Adj_Thr is a threshold for noise adjustment based on maximal brightness, and noise_level_raw is the noise level calculated by noise distribution.

If the noise does not obey normal distribution as in curve 122, it should decrease the noise level in order to avoid wrong estimation. In the meanwhile, the process decreases the noise_hist_sum to get adj_noise_hist_sum, i.e., the count of pixels which contribute to noise estimation is decreased.

Because the noise is estimated in both forward and backward directions, it is necessary to fuse these two estimations. The backward noise level between CF_LR and P1_LR' is noise_level_p1. The backward noise histogram accumulation sum is adj_noise_hist_sum_p1. The forward noise level between CF_LR and F1_LR is noise_level_f1. The forward noise histogram accumulation sum is adj_noise_hist_sum_f1.

The fused noise level is calculated as follows.

wgt=adj_noise_hist_sum_p1/(adj_noise_hist_sum_p1+adj_noise_hist_sum_f1);

tmp_noise_level=noise_level_f1+wgt*(noise_level_p1−noise_level_f1).

In order to keep noise estimation consistent and stable in temporal domain, it is necessary to smooth noise level between current noise level and previous noise level. The logic is as follows.

tpr_noise_level=(pre_noise_level+3*tmp_noise_level)/4;

noise_delta=tpr_noise_level−pre_noise_level;

if noise_delta>0, noise_level=pre_noise_level+min(noise_delta,Noise_Adj_Thr).

else, noise_level=pre_noise_level+noise_delta.

In this manner, the motion compensation process can be combined with the super resolution process to result in super resolution image data with reduced noise. This process does so with reduced hardware and reduced time.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of estimating a noise level for a frame of image data, comprising:
   estimating an amount of noise at a pixel, wherein the amount of noise is calculated based on a difference between each interpolated pixel location in a current frame and a pixel in a noise reduced previous frame as previous frame differences, and a difference between each interpolated pixel location in the current frame and a pixel in a future frame as future frame differences;
   adjusting the previous and future frame differences based upon sample errors between pixels in the current frame to produce adjusted previous and adjusted future frame differences, wherein the sample error for each pixel in the current frame is a minimum distance between the interpolated pixel location and pixels surrounding the interpolated pixel location;

calculating the noise level in the image data based upon a distribution of the noise from previous frame differences and a distribution of the noise from future frame differences to produce a previous noise level value and a future noise level value; and combining the previous and future noise level values to produce a combined noise level estimate for the current frame.

2. The method of claim 1, wherein estimating the amount of noise comprises only using pixels having reliable motion vectors.

3. The method of claim 1, further comprising adjusting the amount of noise based upon a distribution shape of the noise and a brightness level in the image data.

4. The method of claim 3, wherein the distribution shape comprises a normal distribution shape and the noise is increased for normal distributions.

5. The method of claim 1, wherein estimating an amount of noise comprises finding a noise level from a noise histogram.

6. The method of claim 1, wherein combining the previous and future noise level values further comprises fusing a current combined noise estimate with previous combined noise estimates from previous frames.

7. The method of claim 1, wherein fusing the current combined noise estimate with previous combined noise estimates from previous frames involves weighting the combined noise estimates based upon whether the current noise level is increasing or decreasing.

8. The method of claim 1, wherein combining the previous and future noise level values results in more than one noise estimate for the current frame.

9. The method of claim 1 wherein combining the previous and future noise level values comprises increasing the previous noise level values prior to the combining.

10. The method of claim 1 wherein combining the previous and future noise level values comprises decreasing the future noise level values prior to the combining.

\* \* \* \* \*